US012710089B2

(12) United States Patent
Kim

(10) Patent No.: US 12,710,089 B2
(45) Date of Patent: Aug. 18, 2026

(54) VIBRATION ABSORPTION DEVICE FOR A HEAD-UP DISPLAY DRIVING MODULE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 210 days.

(21) Appl. No.: 18/411,224

(22) Filed: Jan. 12, 2024

(65) Prior Publication Data

US 2024/0369126 A1 Nov. 7, 2024

(30) Foreign Application Priority Data

May 4, 2023 (KR) ........................ 10-2023-0058163

(51) Int. Cl.

*F16F 15/06* (2006.01)
*F16M 5/00* (2006.01)
*B60R 11/00* (2006.01)
*B60R 11/02* (2006.01)

(52) U.S. Cl.

CPC ............... *F16F 15/06* (2013.01); *F16M 5/00* (2013.01); *B60R 2011/0042* (2013.01); *B60R 11/0235* (2013.01)

(58) Field of Classification Search

CPC ....... F16F 15/06; F16M 5/00; B60R 11/0235; B60R 2011/0042; B60K 35/23; B60K 35/231; B60K 2360/84

See application file for complete search history.

(56) References Cited

U.S. PATENT DOCUMENTS

| | | | | |
|---|---|---|---|---|
| 6,950,244 B2 * | 9/2005 | Makii | G02B 7/10 | 359/823 |
| 7,506,843 B2 * | 3/2009 | McKelvey | B60R 11/02 | 248/609 |
| 11,307,426 B2 * | 4/2022 | Uragami | G02B 30/54 | |
| 11,628,779 B2 * | 4/2023 | Kim | B60R 11/0235 | 348/837 |
| 11,796,811 B2 * | 10/2023 | Wagle | G02B 7/182 | |
| 12,174,520 B2 * | 12/2024 | Kim | B60K 35/23 | |
| 12,375,789 B2 * | 7/2025 | Liu | H04N 23/695 | |
| 12,496,906 B2 * | 12/2025 | Kim | B60K 35/231 | |
| 2014/0368941 A1 * | 12/2014 | Sato | G02B 7/1827 | 359/877 |
| 2016/0139410 A1 * | 5/2016 | Shin | G02B 27/0179 | 359/631 |
| 2017/0336632 A1 * | 11/2017 | Ushida | H04N 5/74 | |
| 2018/0059417 A1 * | 3/2018 | Furusawa | B60K 35/23 | |
| 2019/0086663 A1 * | 3/2019 | Hatasako | G02B 27/0149 | |
| 2019/0107717 A1 * | 4/2019 | Heinrich | B60K 35/50 | |

(Continued)

FOREIGN PATENT DOCUMENTS

CN 108331882 B * 12/2019 ............. F16F 15/14

*Primary Examiner* — Eret C McNichols

(74) *Attorney, Agent, or Firm* — NovoTechIP International PLLC

(57) ABSTRACT

A vibration absorption device for a head-up display driving module, the device comprising: a power generation unit disposed at one end of the driving module and configured to generate rotational force using a motor fixed through a motor mount; and a cantilever-type dynamic absorber coupled to opposite ends of the motor mount to absorb vibration of the power generation unit.

6 Claims, 10 Drawing Sheets

(56) References Cited

U.S. PATENT DOCUMENTS

| | | | | |
|---|---|---|---|---|
| 2021/0364780 | A1* | 11/2021 | Kim | B60K 35/53 |
| 2023/0120396 | A1* | 4/2023 | Ogura | G02B 7/1821 |
| 2024/0294068 | A1* | 9/2024 | Kim | B60K 35/231 |
| 2025/0383545 | A1* | 12/2025 | Kim | B60K 35/23 |

* cited by examiner

VIBRATION ABSORPTION DEVICE FOR A HEAD-UP DISPLAY DRIVING MODULE

CROSS-REFERENCE TO RELATED APPLICATIONS

This application claims priority under 35 U.S.C. § 119 to Korean Patent Application No. 10-2023-0058163, filed on May 4, 2023, in the Korean Intellectual Property Office, the disclosure of which is incorporated herein by reference in its entirety.

TECHNICAL FIELD

The present disclosure relates to a vibration absorption device for a head-up display driving module.

BACKGROUND

The contents described in this section merely provide background information related to the present disclosure and do not constitute prior art.

A head-up display is a device that displays an image containing vehicle speed, fuel level, road guidance information, etc. on a windshield, which is a front window of a vehicle. The head-up display is generally configured to display on the windshield display information projected from a picture generating unit.

The head-up display rotates an aspherical mirror using a motor. As the RPM (Revolution Per Minute) of the motor increases, motor vibration, that is, acceleration generated by the motor increases. The conventional head-up display discloses a technology to suppress vibration of the motor using a dynamic absorber made of a metal material such as brass. However, the dynamic absorber made of metal such as brass has a greater weight than those of the motor and a motor mount that fix the motor. As a result, the manufacturing cost of the head-up display driving module may increase, and the total weight of the head-up display driving module may increase.

SUMMARY

In view of the above, a first embodiment of the present disclosure provides a vibration absorption device for a head-up display driving module which is capable of simplifying an assembly process by coupling a cantilever type dynamic absorber to an upper motor mount, and attenuating vibration and noise of a motor.

Further, second and third embodiments of the present disclosure provide a vibration absorption device for a head-up display driving module which is capable of simplifying an assembly process by coupling a cantilever type dynamic absorber to a lower motor mount, and attenuating vibration and noise of a motor.

In addition, fourth and fifth embodiments of the present disclosure provide a vibration absorption device for a head-up display driving module in which is capable of attenuating vibration and noise of a motor by configuring a part of a lower motor mount as a cantilever type dynamic absorber and coupling a mass to one end of the cantilever type dynamic absorber.

According to the first to fifth embodiments of the present disclosure, the vibration absorption device for the head-up display driving module can reduce the manufacturing cost using a fastening member, the lower motor mount, and the mass, minimize the overall weight of the driving module, and attenuate the vibration and noise of the motor.

The objectives to be achieved by the present disclosure are not limited to the objectives mentioned above, and other objectives not mentioned will be clearly understood by those skilled in the art from the description below.

According to the first embodiment of the present disclosure, the vibration absorption device for the head-up display driving module can simplify the assembly process by coupling the cantilever type dynamic absorber to the upper motor mount, and attenuate vibration and noise of the motor.

According to the second and third embodiments of the present disclosure, the vibration absorption device for the head-up display driving module can simplify the assembly process by coupling the cantilever type dynamic absorber to the lower motor mount, and reduce vibration and noise of the motor.

According to the fourth and fifth embodiments of the present disclosure, the vibration absorption device for the head-up display driving module can attenuate vibration and noise of the motor by configuring a part of the lower motor mount as the cantilever type dynamic absorber and coupling the mass to one end of the cantilever type dynamic absorber.

According to the first to fifth embodiments of this disclosure, the vibration absorption device for the head-up display driving module can reduce the manufacturing cost using the fastening member, the lower motor mount, and the mass, minimize the overall weight of the driving module, and attenuate vibration and noise of the motor.

DETAILED DESCRIPTION

Figure 1:
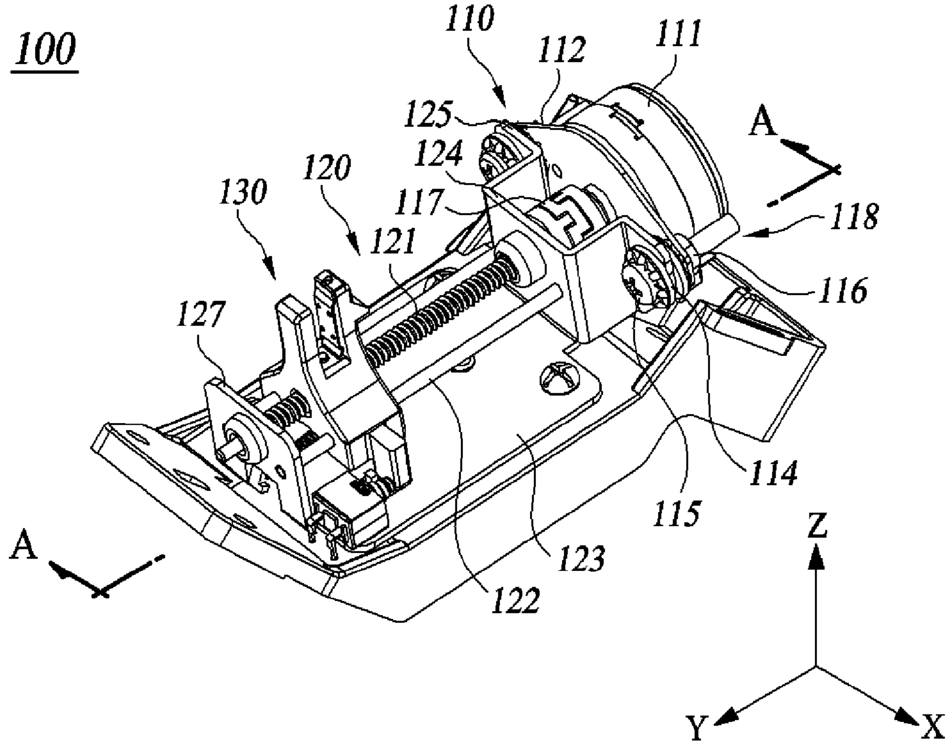
FIG. 1 is a perspective view illustrating a vibration absorption device for a head-up display driving module according to a first embodiment of the present disclosure.

FIG. 1 is a perspective view illustrating a vibration absorption device for a head-up display driving module according to a first embodiment of the present disclosure.

Figure 2:
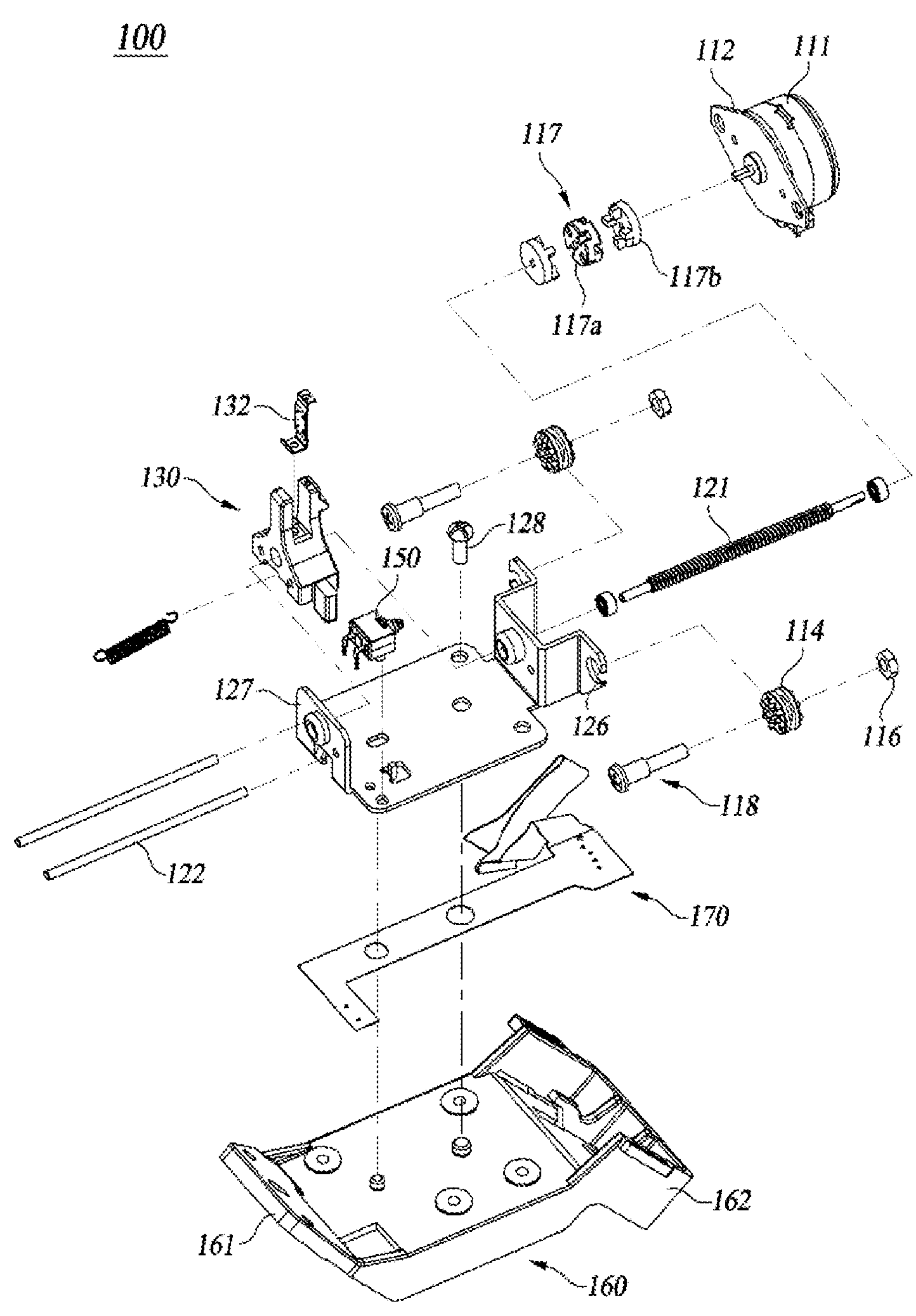
FIG. 2 is an exploded perspective view illustrating the vibration absorption device for the head-up display driving module according to the first embodiment of the present disclosure.

FIG. 2 is an exploded perspective view illustrating the vibration absorption device for the head-up display driving module according to the first embodiment of the present disclosure.

Figure 3:
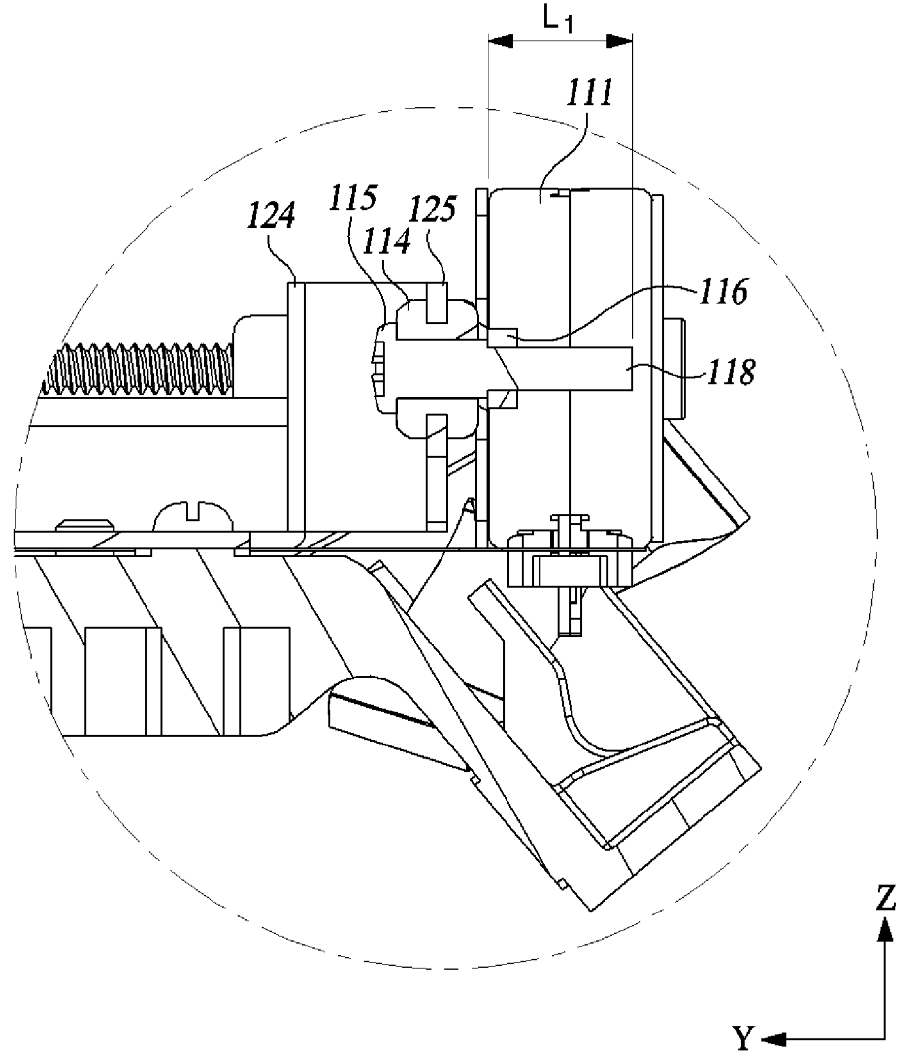
FIG. 3 is a cross-sectional view taken along line A-A of FIG. 1, which is viewed from the right side.

FIG. 3 is a cross-sectional view taken along line A-A of FIG. 1, which is viewed from the right side.

Referring to FIGS. 1 to 3, a head-up display driving module 100 according to the first embodiment of the present disclosure includes a power generation unit 110 and a power transmission unit 120.

The head-up display driving module 100 may further include a link unit (not shown) and an elastic unit (not shown).

The head-up display driving module 100 rotates an aspherical mirror (not shown) by moving up and down the link unit 130 based on rotational force of a motor 111.

The power generation unit 110 may include all or some of the motor 111, an upper motor mount 112, a damper 114, a fastening member 115, a nut 116, a flexible coupling 117, a cantilever type dynamic absorber 118.

The motor 111 may include a lead screw 121 forming a rotation axis. The lead screw 121 is connected to a rotating shaft of the motor 111 in an extension direction to be rotatable, and may be integrally formed with the power generation unit 110 or may have an attachable/detachable structure that can be assembled to and separated from the power generation unit 110. In this case, the flexible coupling 117 connects the rotating shaft of the motor 111 and the lead screw 121. The flexible coupling 117 may attenuate vibration generated from the rotating shaft of the motor 111.

The upper motor mount 112 includes a plurality of through-holes (not shown) to allow the motor 111 to be fixed in the drive module housing 160. The upper motor mount 112 may be integrally formed with the motor 111.

The upper motor mount 112 is formed to protrude in a second direction with respect to a central axis of the motor 111. The upper motor mount 112 includes two or more through-holes (not shown) formed in both end portions (i.e., opposite end portions) of the upper motor mount 112 to extend therethrough in a first direction. In this case, the first direction means the −y-axis direction, and the second direction means the x-axis and −x-axis directions.

When the motor 111 is driven, vibration generated from the motor 111 is transmitted to the damper 114 through the upper motor mount 112. In this case, the damper 114 can reduce noise generated in the driving module 100 by attenuating the vibration of the motor 111 through the upper motor mount 112.

The power transmission unit 120 includes all or some of a lead screw 121, a guide shaft 122, a lead screw bracket 123, a lower mount 124, and a damper mount 125, an open hole 126, an upper mount 127, and a tapping screw 128.

The lead screw bracket 123 is seated on a body of the driving module housing 160. The lead screw bracket 123 may be coupled to the driving module housing 160 using the tapping screw 128.

The lead screw bracket 123 may include a plurality of holes (not shown). In this case, the plurality of holes of the lead screw bracket 123 may be a long-slotted hole and a short-slotted hole. The long-slotted hole and the short-slotted hole are preferably formed to correspond to a plurality of locating pins (not shown) formed in the driving module housing 160. Accordingly, the locating pins of the drive module housing 160 are coupled to the long-slotted hole and the short-slotted hole of the lead screw bracket 123, thereby preventing the lead screw bracket 123 from rotating on the drive module housing 160.

The lead screw bracket 123 is provided with the lower mount 124 and the upper mount 127. The lower mount 124 and the upper mount 127 are formed to extend perpendicular to the lead screw bracket 123.

The lower mount 124 includes a through-hole (not shown) through which the lead screw 121 passes, and a bearing (not shown) is inserted into the through-hole. The lower mount 124 may have at a lower side portion an accommodation space in which the flexible coupling 117 is accommodated.

The damper mount 125 is formed to extend from the lower mount 124. The damper mount 125 is formed with an open hole 126 so that the second damper 114 can be fitted in the open hole 126. The open hole 126 is formed in a hollow shape in which an inner circumferential surface of the open hole 126 is partially opened in a circumferential direction thereof.

The upper mount 127 receives a longitudinal end portion of the lead screw 121 to be rotatable. The upper mount 127 is coupled with an elastic fixing part 141 and an elastic mount 142 using bolts 144. Therefore, they include a plurality of through-holes through which the bolts 144 are fitted.

The guide shaft 122 is extended parallel to the lead screw 121 between the lower mount 124 and the upper mount 127 while being spaced apart from the lead screw 121. The guide shaft 122 may be coupled to the link unit 130 by passing through a portion of the link unit 130. When the link unit 130 moves up and down along the lead screw 121 in a moving range, the guide shaft 122 may guide the link unit 130 so that the link unit 130 moves up and down without rotating.

The link unit 130 includes a main body (not shown), a slot (not shown), and a clip 132.

A central through-hole (not shown) is formed in a center portion of the main body of the link unit 130 so that the lead screw 121 is fitted into the central through-hole. In the central through-hole (not shown) formed in the main body of the link unit 130, a screw thread corresponding to a screw thread of the lead screw 121 is formed. Accordingly, the link unit 130 moves up and down as the lead screw 121 rotates.

The slot of the link unit 130 extends from the main body and has a 'U' shape with one side open. The clip 132 is made of a 'U' shape corresponding to the open side of the slot and is snap-fitted into the slot. In this case, it is preferable that the clip 132 is configured to be detachably fitted in the slot.

The drive module housing 160 includes an upper housing 161 and a lower housing 162. The upper housing 161 and the lower housing 162 are respectively formed at upper and lower sides of the drive module housing 160. The upper housing 161 and the lower housing 162 are inclined in a diagonal direction with respect to the body of the driving module housing 160.

The lower housing 162 is coupled with a cable slit (not shown). In this case, the cable slit is coupled to a conductive wire connected to the motor 111, that is, a flexible cable 170. The flexible cable 170 can be installed in all directions on the left and right sides of the motor 111.

The cantilever-type dynamic absorber 118 according to the first embodiment of the present disclosure may be formed by extending one end of the fastening member 115 in the first direction, for example, in the −y axis direction. The cantilever-type dynamic absorber 118 may extend from one surface of the upper motor mount 112 by a distance L1. The stiffness and mass of the cantilever-type dynamic absorber 118 vary depending on the extension distance L1 of the cantilever-type dynamic absorber 118. The extension distance L1 of the cantilever-type dynamic absorber 118 is preferably set so that a target frequency of the cantilever-type dynamic absorber 118 becomes the same as (i.e., corresponds to) a natural frequency of the power generation unit 110.

The cantilever-type dynamic absorber 118 may pass through both of the through-holes of the damper 114 and the upper motor mount 112 to be coupled thereto. Accordingly, the cantilever-type dynamic absorber 118 according to the first embodiment of the present disclosure is configured by extending one end of the fastening member 115. Specifically, the fastening member 115 includes a head, a shank, and a thread. The thread of the fastening member 115 may be extended by a preset distance in a longitudinal direction to form the cantilever-type dynamic absorber 118.

Figure 4:
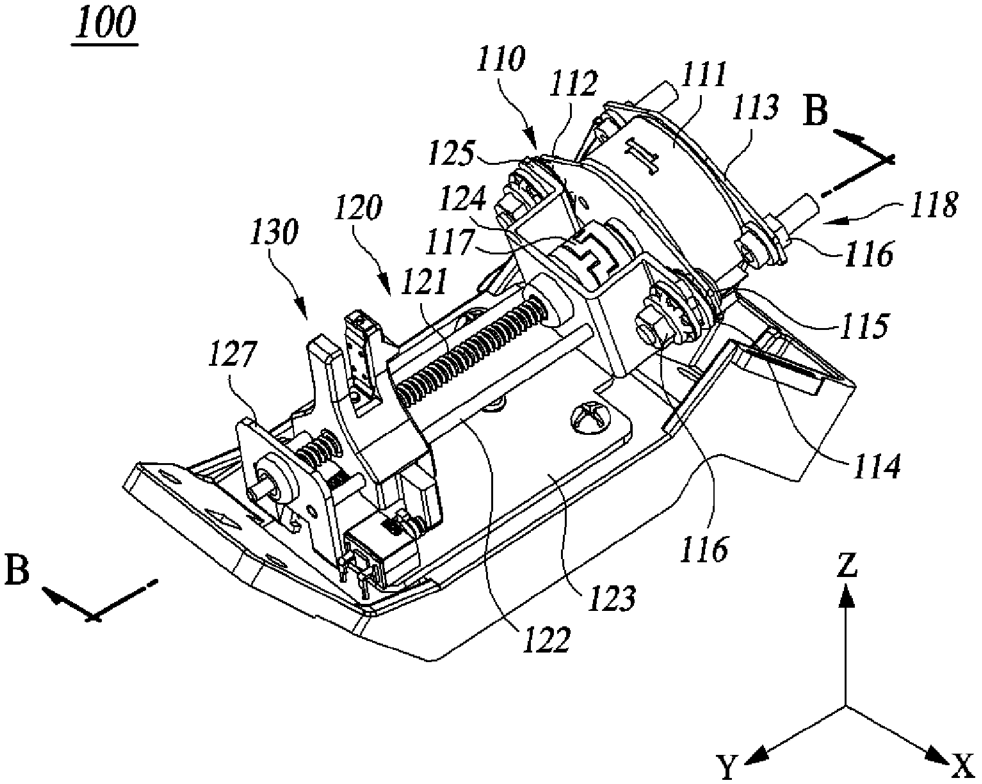
FIG. 4 is a perspective view illustrating a vibration absorption device for a head-up display driving module according to a second embodiment of the present disclosure.

FIG. 4 is a perspective view illustrating a vibration absorption device for a head-up display driving module according to a second embodiment of the present disclosure.

Figure 5:
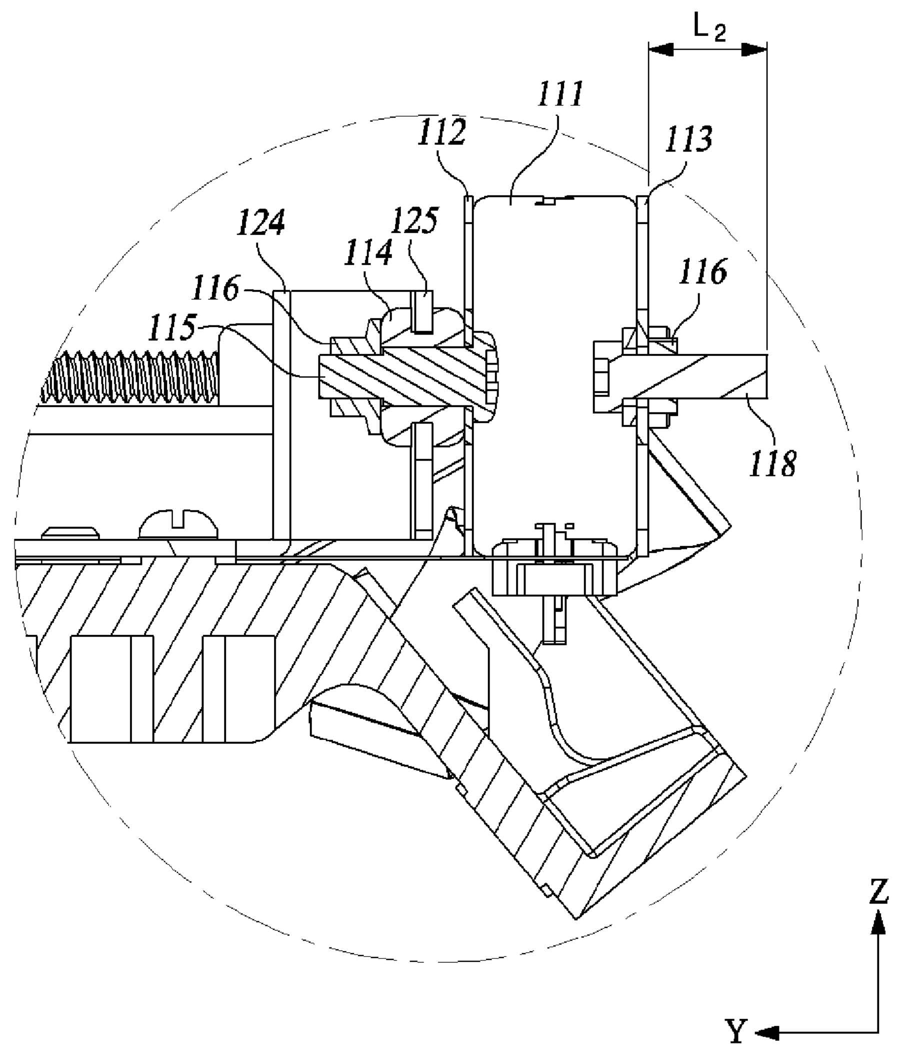
FIG. 5 is a cross-sectional view taken along line B-B of FIG. 4, which is viewed from the right side.

FIG. 5 is a cross-sectional view taken along line B-B of FIG. 4, which is viewed from the right side.

Hereinafter, in the description of the configuration of the head-up display driving module 100 according to the second embodiment, redundant description of the contents overlapping with the configuration of the head-up display driving module 100 according to the first embodiment described above will be omitted and the differences will be described.

Referring to FIGS. 4 and 5, the head-up display driving module 100 according to the second embodiment of the present disclosure includes a lower motor mount 113. The lower motor mount 113 may be disposed at a lower side of the motor 111. The shape of the lower motor mount 113 corresponds to the shape of the upper motor mount 112.

The lower motor mount 113 includes through-holes (not shown) in both (i.e., opposite) end portions. In this case, the through-holes formed in the lower motor mount 113 may be formed on the same central axes as the through-holes formed in the upper motor mount 112, respectively. The cantilever-type dynamic absorber 118 may be coupled to each of the through-holes of the lower motor mount 113.

The cantilever-type dynamic absorber 118 according to the second embodiment of the present disclosure may be coupled in the first direction. In this case, the first direction may be the −y-axis direction. The cantilever-type dynamic absorber 118 is coupled to the through-hole using a nut 116. The cantilever-type dynamic absorber 118 extends from one surface of the lower motor mount 113 by an extension distance L2. The cantilever-type dynamic absorber 118 may extend by the preset distance L2 and attenuate vibration and noise of the power generation unit 110 based on a mass and stiffness thereof. The cantilever-type dynamic absorber 118 according to the second embodiment of the present disclosure may have, for example, a shoulder bolt shape.

Figure 6:
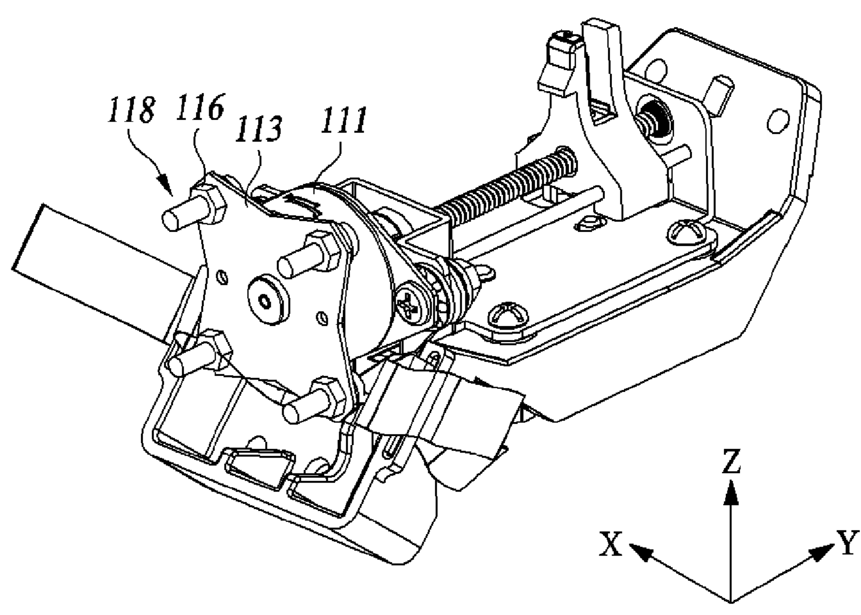
FIG. 6 is a perspective view illustrating a vibration absorption device for a head-up display driving module according to a third embodiment of the present disclosure.

FIG. 6 is a perspective view illustrating a vibration absorption device for a head-up display driving module according to a third embodiment of the present disclosure.

Referring to FIG. 6, the lower motor mount 113 according to the third embodiment of the present disclosure includes a plurality of through-holes. The plurality of through-holes may be radially arranged on the lower motor mount 113 with respect to the central axis of the motor 111. When the magnitude of vibration according to the frequency generated by the motor 111 increases, the absorption capacity can be increased by increasing the number of cantilever-type dynamic absorbers 118.

Four or more cantilever-type dynamic absorbers 118 are coupled to the through-holes of the lower motor mount 113. In this case, in order to maintain the balance of the head-up display driving module, it is preferable that the cantilever-type dynamic absorbers 118 are arranged at regular angular intervals. The cantilever-type dynamic absorber 118 according to the third embodiment of the present disclosure may have, for example, a shoulder bolt shape.

Figure 7:
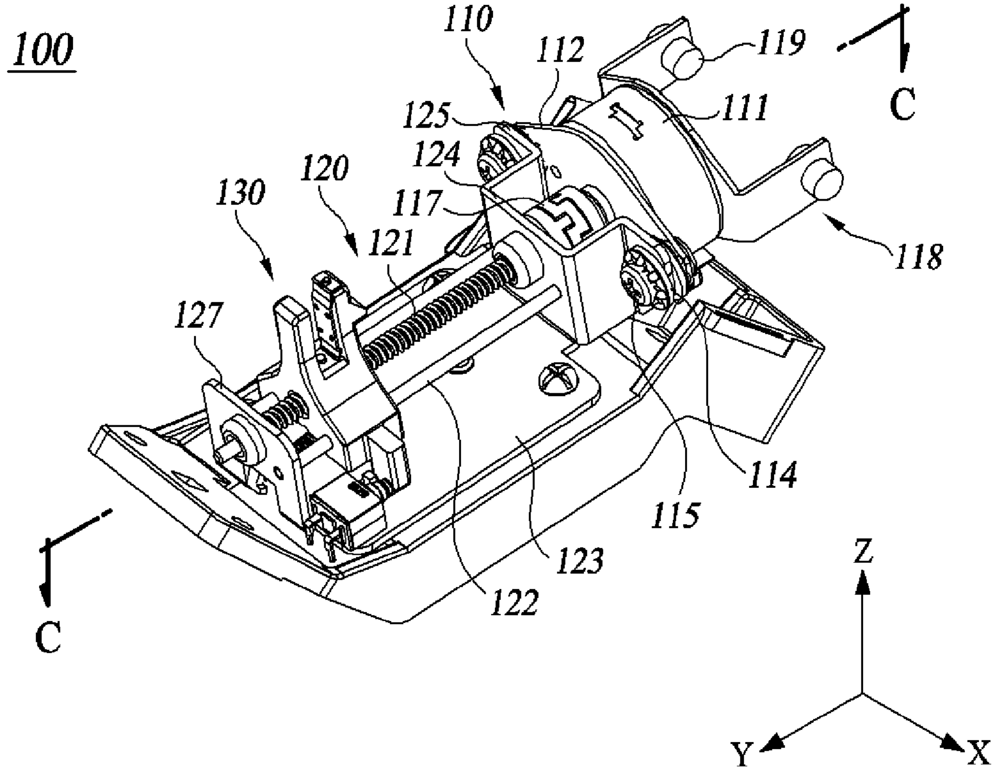
FIG. 7 is a perspective view illustrating a vibration absorption device for a head-up display driving module according to a fourth embodiment of the present disclosure.

FIG. 7 is a perspective view illustrating a vibration absorption device for a head-up display driving module according to a fourth embodiment of the present disclosure.

Figure 8:
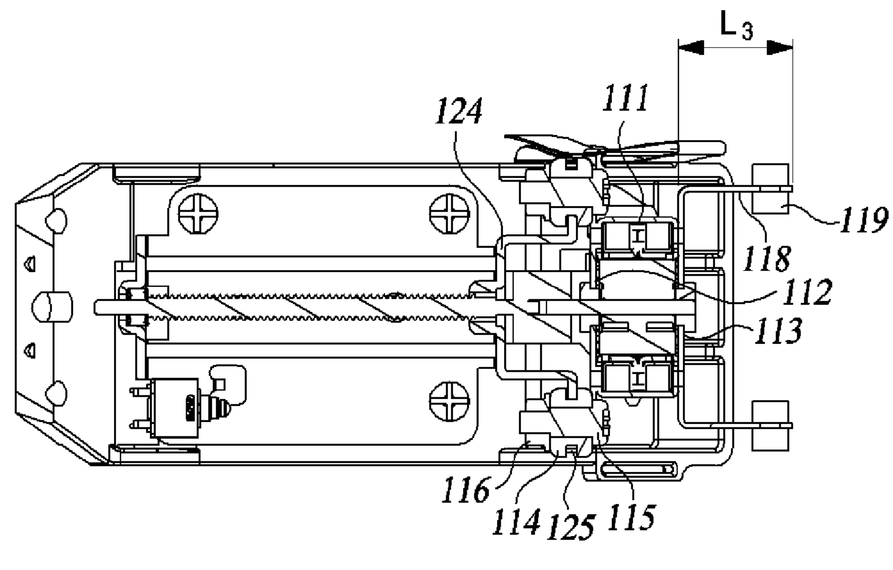
FIG. 8 is a cross-sectional view taken along line C-C of FIG. 7.
Figure 8:
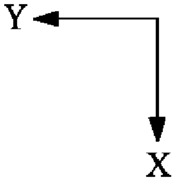

FIG. 8 is a cross-sectional view taken along line C-C of FIG. 7.

Hereinafter, in the description of the configuration of the head-up display driving module 100 according to the fourth embodiment, redundant description of the contents overlapping with the configuration of the head-up display driving module 100 according to the first and second embodiments described above will be omitted and the differences will be described.

Referring to FIGS. 7 and 8, the head-up display driving module 100 according to the fourth embodiment of the present disclosure includes a lower motor mount 113, a cantilever dynamic absorber 118, and a mass body 119.

The cantilever-type dynamic absorber 118 according to the fourth embodiment of the present disclosure may be formed by extending a portion of the lower motor mount 113 in a third direction. In this case, the third direction is the −y-axis direction. Accordingly, the lower motor mount 113 is coupled to a lower part of the motor 111 and the extended portion thereof performs the function of the cantilever-type dynamic absorber 118.

The cantilever-type dynamic absorber 118 according to the fourth embodiment of the present disclosure forms a stiffness depending on a thickness and a length extending from the lower surface of the motor 111.

The mass body 119 is coupled to one end of each of the cantilever-type dynamic absorbers 118. The mass body 119 has a mass m2. Accordingly, in the head-up display driving module 100 according to the fourth embodiment of the present disclosure, the target frequency may be calculated based on a stiffness k2 of the cantilever-type dynamic absorber 118 and the mass m2 of the mass body. In this case, in the cantilever type dynamic absorber 118 according to the fourth embodiment of the present disclosure, the target frequency may be calculated based on the sum of the mass of the mass body 119 and the mass of the extended portion of the lower motor mount.

Accordingly, the head-up display driving module 100 according to the fourth embodiment has an advantage that the stiffness and the mass can be determined separately. In this case, in the head-up display driving module 100 according to the first to third embodiments described above, the stiffness and the mass are determined by extending one end of a single member, for example, the fastening member 115, while in the head-up display driving module 100 according to the fourth embodiment, the stiffness k2 and the mass m2 can be determined by using the cantilever dynamic absorber 118 and the mass body 119. In the head-up display driving module 100 in which the stiffness and the mass are separated, a target frequency close to the natural frequency of the power generation unit 110 can be calculated by using the cantilever-type dynamic absorber 118 and the mass body 119.

Figure 9:
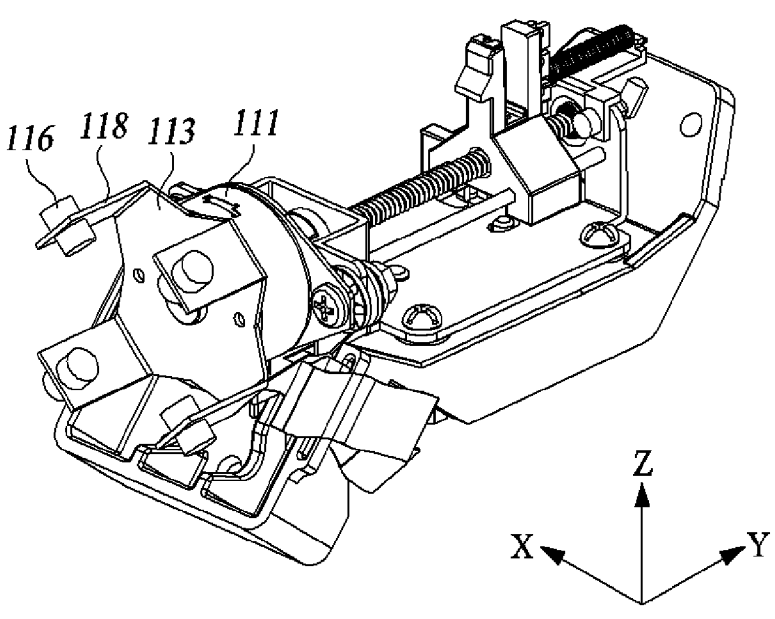
FIG. 9 is a perspective view of a vibration absorption device for a head-up display driving module according to a fifth embodiment of the present disclosure, which is viewed from the rear side.

FIG. 9 is a perspective view of a vibration absorption device for a head-up display driving module according to a fifth embodiment of the present disclosure, which is viewed from the rear side.

Referring to FIG. 9, the head-up display driving module 100 according to the fifth embodiment of the present disclosure includes four or more cantilever-type dynamic absorbers 118. The mass body 119 may also be coupled to each of the four or more cantilever-type dynamic absorbers 118.

The four or more cantilever-type dynamic absorbers 118 are formed on the lower motor mount 113 at regular angular intervals. Accordingly, the cantilever-type dynamic absorbers 118 and the mass bodies 119 can absorb vibration and noise of the power generation unit 110 while maintaining a balance on the head-up display driving module 100.

Figure 10:
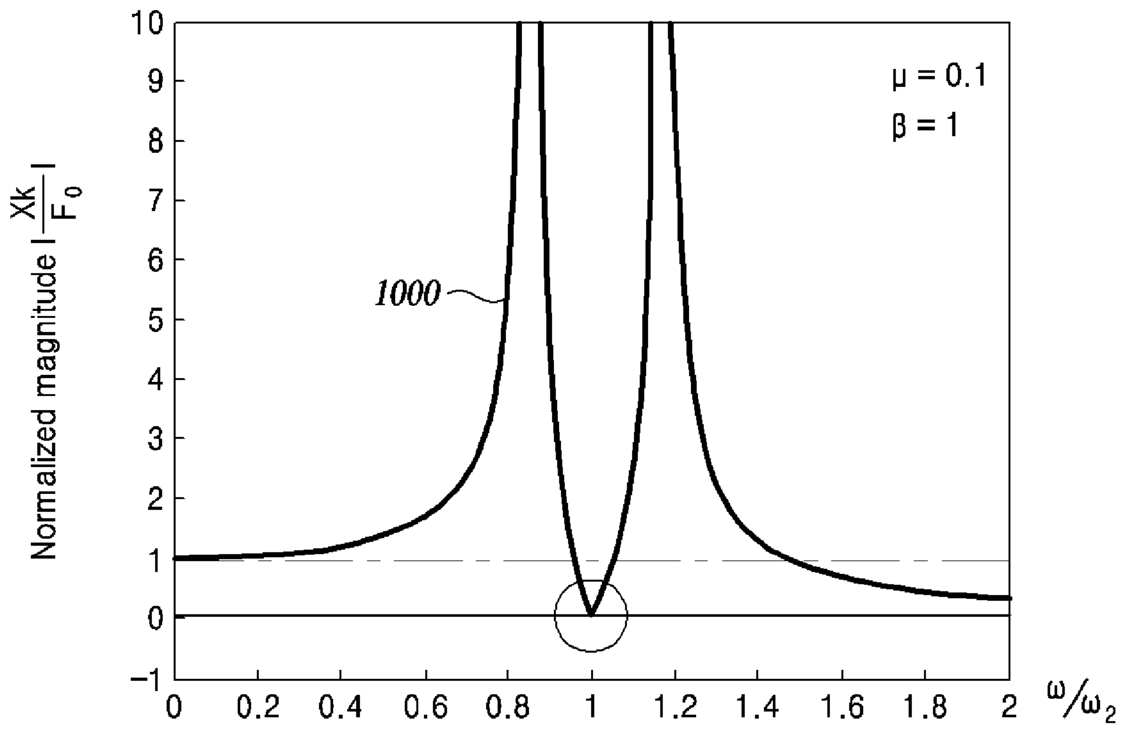
FIG. 10 is a graph illustrating response curves of the head-up display driving modules according to the first to fifth embodiments of the present disclosure.

FIG. 10 is a graph illustrating response curves of the head-up display driving modules according to the first to fifth embodiments of the present disclosure.

Referring to FIG. 10, the motion equation of the head-up display driving module 100 according to the first to fifth embodiments of the present disclosure is expressed as the following Equation 1.

$$m_1\ddot{x}_1 + k_1x_1 + k_2(x_1 - x_2) = F_o\cos\omega t$$
$$m_2\ddot{x}_2 + k_2(x_2 - x_1) = 0 \quad \text{(Equation 1)}$$

where, m1, k1, and x1 mean the mass, stiffness (hereinafter, 'elastic coefficient'), and amplitude of the power generation unit 110, and m2, k2 and x2 mean the mass, elastic coefficient and amplitude of the cantilever dynamic absorber 118. In the case of the above-described fourth and fifth embodiments, m2 means the sum of the mass of the cantilever-type dynamic absorber 118 and the mass of the mass body 119. F0 means the excitation force of the power generation unit 110.

By substituting $$\begin{Bmatrix} x_1 \\ x_2 \end{Bmatrix} = \begin{Bmatrix} X_1 \\ X_2 \end{Bmatrix}\cos\omega t$$

into Equation 1 by the undetermined coefficient method, the amplitudes of the power generation unit 110 and the cantilever-type dynamic absorber 118 can be calculated as in the following Equation 2.

$$X_1 = \frac{(k_2 - m_2\omega^2)F_0}{(k_1 + k_2 - m_1\omega^2)(k_2 - m_2\omega^2)k_2^2}$$
$$X_2 = \frac{k_2F_0}{(k_1 + k_2 - m_1\omega^2)(k_2 - m_2\omega^2)k_2^2} \quad \text{(Equation 2)}$$

When the cantilever-type dynamic absorber 118 is attached to the head-up display driving module 100 based on Equation 2, the condition that the amplitude X1 of the power generation unit 110 near the resonance point before attachment becomes zero is equal to Equation 3 below.

$$\omega^2 = \frac{k_2}{m_2} = \frac{k_1}{m_1} \quad \text{(Equation 3)}$$

Accordingly, in order for the amplitude X1 of the power generation unit 110 to be 0 near the resonance point, the ratio of the mass m1 and the elastic coefficient k1 of the power generation unit 110 and the ratio of the mass m2 and the elastic coefficient k2 of the cantilever-type dynamic absorber 118 need to be designed to be the same. In the case of the above-described fourth and fifth embodiments, m2 is determined as the sum of the mass of the cantilever-type dynamic absorber 118 and the mass of the mass body 119.

If X1 is expressed using $$\omega_1^2 = \frac{k_1}{m_1}, \omega_2^2 = \frac{k_2}{m_2}$$

it can be expressed as the following Equation 4.

$$\frac{X_1k_1}{F_0} = \frac{[1 - (\omega/\omega_2]^2}{[1 + k_2/k_1 - (\omega/\omega_1)^2][1 - (\omega/\omega_2)^2] - k_2/k_1} \quad \text{(Equation 4)}$$

Based on Equation 4, if $$\mu \equiv \frac{m_2}{m_1} \text{ and } \beta \equiv \frac{\omega_2}{\omega_1}$$

a relational expression such as $$\left(\frac{k_2}{k_1}\right) = \mu\beta^2$$

is established. The motion equation of the head-up display driving module 100 is summarized using this relational expression as the following Equation 5.

$$\kappa_1 = \frac{X_1k_1}{F_0} = \frac{[1 - (\omega/\omega_2)]^2}{[1 + \mu\beta^2 - (\omega/\omega_2)^2\beta^2][1 - (\omega/\omega_2)^2] - \mu\beta^2} \quad \text{(Equation 5)}$$

Based on Equation 5, in case of μ=0.1 and β=1.0, when the absolute value of k1 is represented, the displacement of the head-up display driving module 100 is formed as a response displacement 1000.

Accordingly, the head-up display driving module 100 according to the first to fifth embodiments of the present disclosure can absorb vibration and noise so that the displacement of the power generation unit 110 becomes zero using the cantilever-type dynamic absorber 118 or the cantilever-type dynamic absorber 118 and the mass body 119.

In the head-up display driving module 100 according to the first to fifth embodiments of the present disclosure, when designing the cantilever-type dynamic absorber 118 and the mass body 119, the value of k1 is determined to be equal to or less than a preset value. For example, a range of the value of ω/ω2 may be determined such that the displacement of the head-up display driving module 100 converges to zero.

In addition, when designing the mass m2 of the cantilever-type dynamic absorber 118 and the mass body 119, the mass is determined in the range of 0.05≤μ≤0.25. When the mass m2 of the dynamic absorber 118 and the mass body 119 is, for example, 25% or more or 5% or less of the mass of the power generation unit 110, the performance of the cantilever-type dynamic absorber 118 may deteriorate.

In addition, in order to prevent fatigue failure of the cantilever-type dynamic absorber 118 itself, the magnitude of X2 may be limited to a predetermined value or less. In this case, the maximum amplitude of the cantilever-type dynamic absorber 118 can be calculated using the formula of X2=F0/k2.

What is claimed is:

1. A vibration absorption device for a head-up display driving module, the vibration absorption device comprising:

a power generation unit disposed at one end of the head-up display driving module and configured to generate rotational force using a motor fixed through a motor mount; and a cantilever-type dynamic absorber coupled to opposite ends of the motor mount to absorb vibration of the power generation unit, wherein the cantilever-type dynamic absorber comprises a cantilevered extension portion of a fastening member, which extension portion extends in a cantilevered manner, beyond a location where the fastening member fastens a damper to the motor mount, to absorb vibration of the power generation unit.

2. The vibration absorption device of claim 1, further comprising:

a vibration damping unit including a damper mount disposed at an upper side of the motor mount and the damper fitted into an open hole formed in the damper mount, wherein:

the damper mount and the damper are coupled to the upper side of the motor mount by the fastening member that includes a threaded portion which extends through the damper and the open hole formed in the damper mount;

the vibration damping unit includes a nut that is attached to the threaded portion of the fastening member so that the fastening member and the nut hold the damper mount to the upper side of the motor mount; and the cantilever-type dynamic absorber comprises the cantilevered extension portion which extends from the threaded portion of the fastening member in a cantilevered manner by a predetermined distance $L_1$, beyond a location where the nut is attached to the threaded portion.

3. The vibration absorption device of claim 2, wherein:

the motor mount includes an upper motor mount disposed at an upper side of the motor, and the cantilever-type dynamic absorber is coupled to each of two or more through-holes formed in opposite end portions of the upper motor mount in a first direction.

4. The vibration absorption device of claim 3, comprising a plurality of the cantilever-type dynamic absorbers, and the through-holes are radially arranged with respect to a rotating shaft of the motor so that the cantilever-type dynamic absorbers are arranged at regular angular intervals.

5. The vibration absorption device of claim 1, wherein the cantilever-type dynamic absorber has a preset mass and a preset stiffness, and is formed to extend in a first direction so that a target frequency of the cantilever-type dynamic absorber corresponds to a natural frequency of the power generation unit.

6. The vibration absorption device of claim 5, wherein the cantilever-type dynamic absorber is coupled to the motor mount through a fastening member, and the target frequency is determined by varying a length of the fastening member.

* * * * *